2 Sheets—Sheet 1.

G. F. SIMONDS.

Assignor to THE SIMONDS MANUFACTURING CO.

Tempering and Forming Articles of Steel.

No. 9,663. Reissued April 12, 1881.

WITNESSES

H. Aubrey Toulmin

R. K. Evans

By

INVENTOR

Geo. F. Simonds

Attorneys A. H. Evans & Co

2 Sheets—Sheet 2.

G. F. SIMONDS.

Assignor to THE SIMONDS MANUFACTURING CO.

Tempering and Forming Articles of Steel.

No. 9,663. Reissued April 12, 1881.

Witnesses.
H. Aubrey Toulmin
R. K. Evans

Inventor.
Geo. F. Simonds
by A. H. Evans & Co.
Attys

UNITED STATES PATENT OFFICE.

GEORGE F. SIMONDS, OF FITCHBURG, MASSACHUSETTS, ASSIGNOR TO THE SIMONDS MANUFACTURING COMPANY, OF SAME PLACE.

TEMPERING AND FORMING ARTICLES OF STEEL.

SPECIFICATION forming part of Reissued Letters Patent No. 9,663, dated April 12, 1881.

Original No. 188,198, dated March 6, 1877. Application for reissue filed September 10, 1878.

*To all whom it may concern:*

Be it known that I, GEORGE F. SIMONDS, of Fitchburg, Massachusetts, have invented certain new and useful Improvements in Apparatus for Tempering and Forming Articles of Steel, of which the following is a full, clear, and exact description, reference being had to the accompanying drawings, making a part of this specification, in which—

Figure 1:
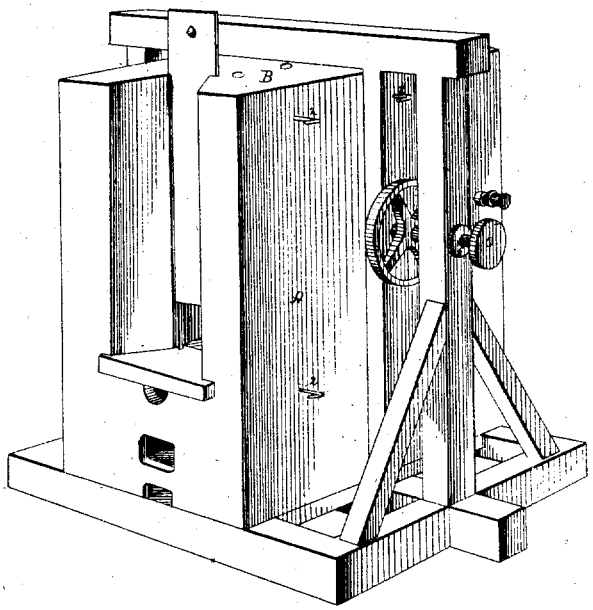
Figure 2:
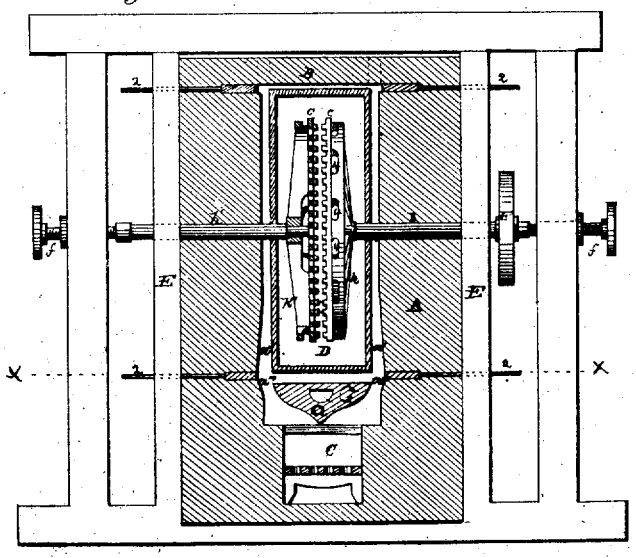
Figure 3:
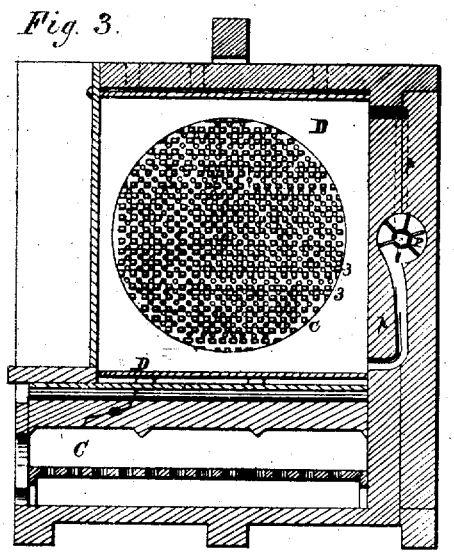
Figure 4:
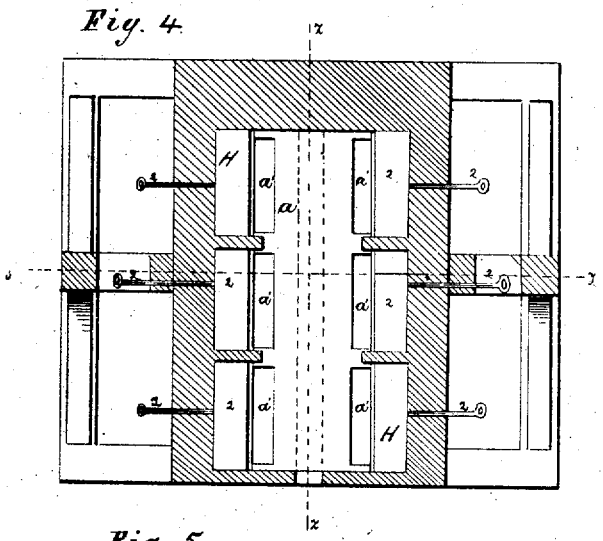
Figure 5:
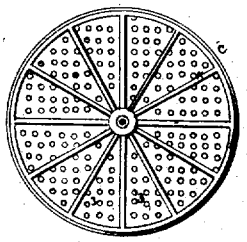

Figure 1 is a perspective view of a tempering-oven with my improvements attached. Fig. 2 is a longitudinal section through *y y* of Fig. 4. Fig. 3 is a vertical cross-section through *z z* of Fig. 4. Fig. 4 is a horizontal section through *x x* of Fig. 2. Fig. 5 represents the rear of one of the formers.

My invention relates to the hardening, tempering, and bringing to their ultimate forms articles of steel, or of steel and iron combined, and is an improvement on Patents No. 151,167, dated May 19, 1874, and No. 169,736, dated November 9, 1875; and it consists in the process of adjusting the "fast" and "loose" in a saw, and in several combinations of devices, hereinafter explained and claimed, whereby saws may be tempered and straightened without the usual process of hammering.

To enable others skilled in the art to make and use my invention, I will proceed to describe the exact manner in which I have carried it out.

In the said drawings, A A represent the walls of an oven, B the roof, C the fire-box, and D the tempering and forming chamber. Above the fire-box is placed the heat-distributer *a*, shaped in cross-section, as shown in Fig. 2, to equally distribute the heat in its passage to the tempering and forming chamber. The flat fire-proof tile which I have heretofore used for this purpose, if not set with great precision horizontally, was liable to distribute the heat unequally to the sides of the forming-chamber, and thus defeat the object sought to be accomplished by an even distribution of heat. To overcome this difficulty I form the distributer *a* as shown in cross-section in Fig. 2 of the drawings, the lower point being placed longitudinally exactly over the center of the fire-box C. This peculiar form of distributer I find, by actual experiment, is a great improvement upon my former patents. The distributer *a* is constructed of equal width on its upper flat surface with the forming-chamber D, and having on each side a flue, *a''*, opening directly under the open flue *a' a'*, extending along the outer side and to the top of the forming-chamber D, to allow the free passage of the heat around all parts of the chamber, the said flues being severally regulated by the dampers 2 2. The distributer *a* is cast with an air-space, G, through its center, as shown. This prevents the distributer from throwing too much heat into the oven by radiation.

The tempering-oven I make according to my Patent No. 169,736, or in any other desirable way.

The formers are suspended in the chamber, as shown in Fig. 2, by means of revolving shafts *b b'*, provided with necessary bearings in the frame-work E E. The outer ends of these shafts are provided with screws *f f*, by which they can be moved longitudinally, and the formers can be closed or opened within the tempering-chamber.

By means of the wheel F the shaft *b* may be easily revolved, and when the formers are brought in contact or closed on an article to be tempered it is evident that the shaft *b'* will also be caused to revolve with the shaft *b*, and the two formers may be revolved within the chamber D. This revolution of the formers may become desirable, in order to secure more certainly a uniform temperature. The great purpose of this construction is to place the article to be tempered and formed entirely out of the reach of any draft, as stated in my Patent No. 169,736, and thus secure an evenness of heat essential to success.

The heat in the surrounding chambers H may be readily regulated or directed from one portion of the chamber D to another by means of the dampers 2 2 and flues *a' a'*.

By means of the flues and dampers, placed so as to completely control the heat in its passages to and around the tempering-oven, I am enabled to throw the heat into the center of the oven or onto the outer edge or on any desired part of the saw, and thus adjust at pleasure the exact tempering of its different portions, which process of adjusting the fast and loose is an essential part of my present invention. If an uneven strain is desired between the center and periphery—that is, if for any other reason it is desirable to have the saw loose in center or loose between center and periphery—I accomplish it and yet leave the saw on any given circle uniform in its tension, which cannot be the result of a saw hammered.

The terms "fast" and "loose," as applied to the manufacture of saws, are well understood by those skilled in the art, and result from an irregular tempering of the saw, the more highly-tempered parts being termed the "fast" and those of lower temper the "loose." It is evident that by the heating of the saw during its operation the expansion of the steel will be influenced by the fast and loose, and hence it becomes a matter of the greatest importance to be able to adjust this fast and loose in the saw, in order to adapt it to its particular work, as before stated.

When the saw or article to be tempered and brought to its ultimate form has been properly hardened, and is placed between the formers *c c*, the door is closed and the article is secured in position by the gradual movement of the screws *f f* until the pressure is sufficient to bring the piece to the desired form, where it is held subjected to the perfectly uniform and desired amount of heat until the article takes a permanent set to the required form, when it can be removed, to make place for another.

My formers *c c* are of a novel construction, as shown in Figs. 3 and 5. The face of the former, instead of being a smooth flat surface, is grooved in such a manner as to divide it up into numerous small surfaces resembling somewhat the face of a waffle-iron. Behind this face is a series of radial ribs, *k*, to strengthen and support the same, and the formers are perforated thickly with small holes 3, while their flanges are slotted at 4 to admit free passage for the heat to all parts of the formers and secure a more uniform temperature.

In further aid of securing a perfectly uniform temperature in the tempering and forming oven, I combine with it the use of the blower P at the junction of the two air-passages *p p*. These passages lead into the oven, and by means of the blower a current may be produced through the passages which will tend to secure a uniform temperature inside the oven D. It is evident that the blower can be placed in a variety of positions to effect the same result; therefore I do not limit myself to the position of the blower as shown in the drawings.

The leading object of this invention, like my inventions upon which this is an improvement, is to produce a perfect saw without the necessity of hammering.

Having thus described my invention, what I claim as new, and desire to secure by Letters Patent, is—

1. The process herein described of adjusting the fast and loose in a saw by throwing the heat on the center or the outer edge or on any desired part of the saw, the same being held to the required position, substantially as set forth.

2. Formers for tempering and forming articles of steel in combination with a fan or blower to equalize the heat, substantially as described.

3. Formers for tempering and forming articles of steel inclosed in a heating-oven in combination with a fan or blower, substantially as set forth.

4. The distributer *a*, constructed with sharp downward point and with ogee sides, substantially as described and shown, in combination with a tempering-oven, substantially as and for the purpose set forth.

5. The distributer *a*, provided with the flues *a''*, in combination with the vertical flues *a'* and dampers, substantially as and for the purpose set forth.

6. Formers constructed with perforations and ribs, as shown and described, in combination with an annealing-oven, substantially as and for the purpose set forth.

GEORGE F. SIMONDS.

Attest:
GEORGE E. DOWNE,
GEORGE E. FERSON.